US005895200A

United States Patent [19]
Sato

[11] Patent Number: 5,895,200
[45] Date of Patent: Apr. 20, 1999

[54] DEVICES AND METHODS FOR LOADING AND UNLOADING LUMBER FOR DRYING

[75] Inventor: Jiro Sato, Asahikawa, Japan

[73] Assignee: Asahi Donetsu Kabushiki Kaisha, Hokkaido, Japan

[21] Appl. No.: 08/908,924

[22] Filed: Aug. 8, 1997

[51] Int. Cl.⁶ ................................................. B65G 57/18
[52] U.S. Cl. .......................... 414/792.7; 414/789.5; 414/927
[58] Field of Search ........................ 414/927, 928, 414/929, 789.5, 796.2, 792.7

[56] References Cited

U.S. PATENT DOCUMENTS

| | | | |
|---|---|---|---|
| 2,613,824 | 10/1952 | Tallman | 414/789.5 |
| 2,928,559 | 3/1960 | Mosely | 414/789.5 |
| 3,343,689 | 9/1967 | Fehely | 414/789.5 |
| 3,565,266 | 2/1971 | Buss | 414/796.2 |
| 3,844,422 | 10/1974 | Smith et al. | 414/927 |
| 4,324,520 | 4/1982 | Kjellberg | 414/789.5 |
| 4,810,152 | 3/1989 | Gillingham et al. | 414/789.5 |
| 4,878,803 | 11/1989 | Whiddon | 414/789.5 |
| 5,437,533 | 8/1995 | Vander Meer et al. | 414/796.2 |

Primary Examiner—Karen M. Young
Assistant Examiner—Gregory A. Morse
Attorney, Agent, or Firm—Watson Cole Grindle Watson, P.L.L.C.

[57] ABSTRACT

An apparatus for loading lumber onto pallets so as to provide a stack of lumber layers separated by pallets for drying in a kiln, and for dismantle after drying includes a first elongated lumber-carrying conveyor, an elongated pallet-loading structure positioned in parallel with the first lumber-carrying conveyor, and an elongated stile-loading and unloading conveyor located between the first lumber-carrying conveyor and the elongated pallet-loading structure and positioned in parallel therewith. A frame structure over the first lumber carrying conveyor, the elongated stile-loading and unloading conveyor and the pallet-loading structure supports a lumber reciprocating drive element for moving aligned lumber between the lumber-carrying conveyor and the stile-loading and unloading conveyor, as well as a pallet reciprocating drive element for moving pallets between the pallet-loading structure and the stile-loading and unloading conveyor.

4 Claims, 14 Drawing Sheets

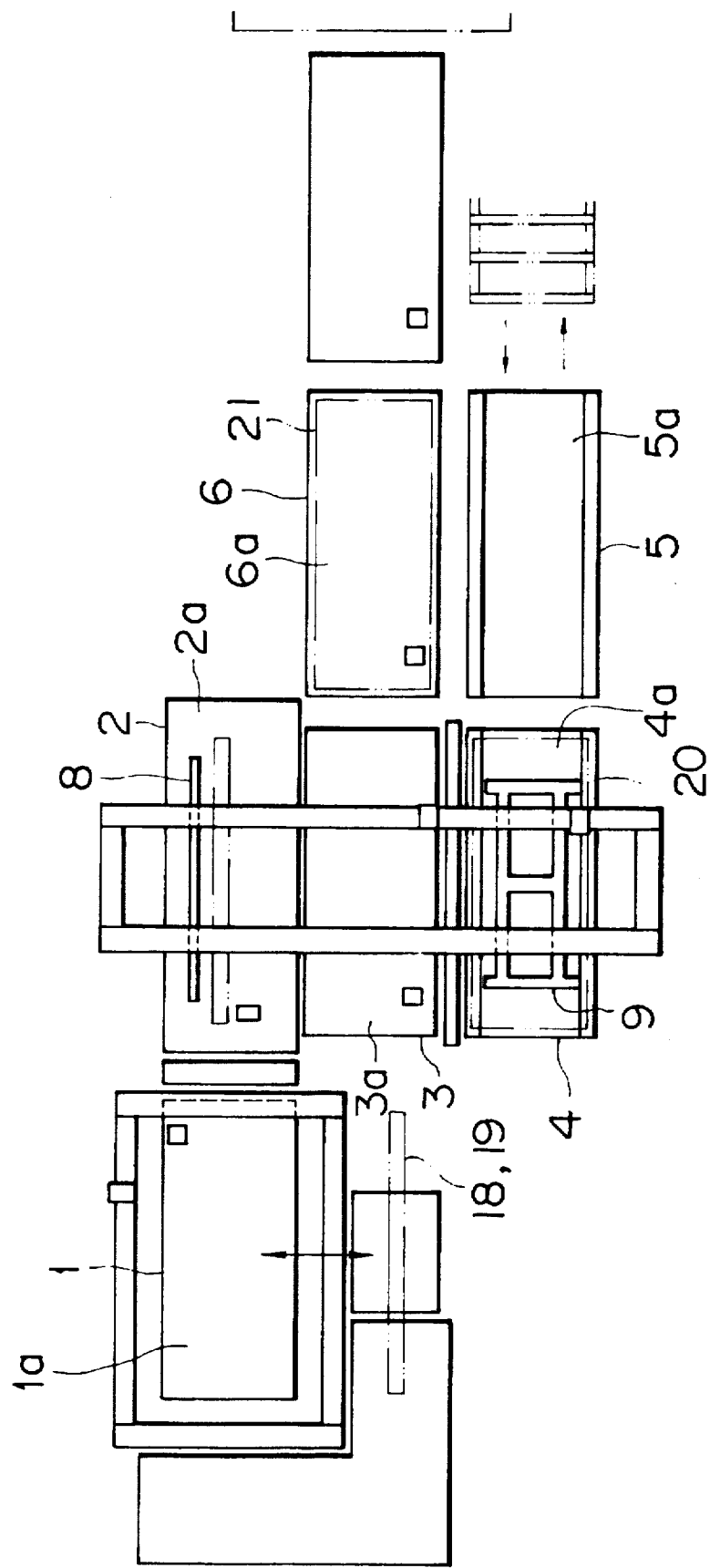

DEVICES AND METHODS FOR LOADING AND UNLOADING LUMBER FOR DRYING

FIELD OF THE INVENTION

This invention relates to devices and methods for stacking and unstacking lumber, and more specifically to devices and methods for loading lumber into a drying kiln so that it can be dried and unloading the lumber after it has been dried and removed from the kiln. As such, the invention is of great practical use in that it helps to improve the efficiency of a wood drying process.

BACKGROUND OF THE INVENTION

When lumber is dried, it is desirable from the viewpoint of efficiency that as much lumber as possible be dried simultaneously in a drying kiln, and a variety of loading devices for that purpose are now in use.

When the drying process is finished, however, there is still another process needed: that is, getting the pallet supporting the lumber out of the kiln and unloading the dried lumber off the pallet. This operation is in most cases manually performed, since the lumber is much lighter after drying. Still, much labor is needed for doing the job. Hence, the unloading process is also desirably to automated. However, installing an unloading machine in addition to a loading machine in a factory will cost an additional amount of money, and factory owners will have to make excessive investment in facilities.

THE SUMMARY OF THE INVENTION

This invention is concerned with stile-loading (multi-pallet loading) and stile-unloading lumber for drying, and it includes the following: a (multi-pallet unloading) lumber-carrying conveyor, a stile-loading and stile-unloading conveyor parallel to the lumber-carrying conveyor, a pallet-loading structure parallel to the stile-loading and stile-unloading conveyor, a lumber-carrying structure extending over from the lumber-carrying conveyor to the stile-loading and stile-unloading conveyor, and a pallet-carrying structure extending over from the stile-loading and stile-unloading conveyor and the pallet-loading structure. The lumber-carrying conveyor has a driving element accommodating a pre-drying lumber and sending out a collected post-driving lumber; the stile-loading and stile-unloading conveyor has a carrying-driving element for carrying the stile-loaded pallet on which the pre-drying lumber is loaded and the pallet on which the post-drying lumber is loaded and also an elevating element for lifting and lowering the carrying-drying element so as to accommodate the pre-drying lumber in multi-layers loaded on pallet on the carrying-driving element; the pallet-loading structure has a guide element for accommodating and sending back the pallet; the lumber-carrying structure has a lumber reciprocating-driving element for reciprocally moving to make the pre-drying lumber line up facing in a certain direction and then transfer it from the lumber-carrying conveyor to the stile-loading and stile-unloading conveyor and to collect the post-drying lumber from the stile-loading and stile-unloading conveyor to the lumber-carrying conveyor; and the pallet-carrying structure has a pallet reciprocating driving-element for reciprocally moving to transfer the pallet from the pallet-loading structure to the stile-loading and stile-unloading conveyor and to collect the pallet from the stile-loading and stile-unloading conveyor to the pallet-loading structure.

This device helps to automate stile-loading operations of conveying the pre-drying lumber to the pallet, stile-loading the lumber in multi-layers on the pallet and sending out the pallet after the layers reaches a determined number. They also help to automate stile-unloading operations of getting back the pallet with the lumber on it after drying and unloading the post-drying lumber from the pallet. Those operations, performed manually, need much of labor, but the devices mentioned in this invention help to perform both the stile-loading and the stile-unloading operations automatically. This means that there has only to be enough space in a factory for one machine to be installed there, and that the machine can be constructed at an economical cost compared with wages paid for the labor needed for performing both the loading and the unloading operations.

This invention has another mechanical feature: a second lumber-carrying conveyor is linked in series with the lumber-carrying conveyor, the pallet-carrying conveyor is linked in series with the stile-loading and stile-unloading conveyor, a pallet-stock conveyor is linked in series with the pallet-loading structure. How many pallet-stock conveyors and pallet-carrying conveyors are needed depends on the size of a whole drying machine.

Since the second lumber-carrying conveyor is linked in series to the lumber-carrying conveyor, it is possible to have the pre-drying lumber on the second lumber-carrying conveyor in advance and then send the lumber onto the lumber-carrying conveyor at a proper time. Also, since the pallet-carrying conveyor is linked in series to the stile-loading and stile-unloading conveyor, it is possible to have the pallet prepared for the drying process on the pallet-carrying conveyor, and since the pallet-stock conveyor is linked in series to the pallet-loading structure, it is possible to keep pallets in stock on the pallet-stock conveyor and provide them when needed while stile-loading is going on, and to accept and have them in stock while stile-unloading is going on.

Another feature of the device referred to in this invention is this: the lumber-carrying conveyor, the stile-loading and stile-unloading conveyor, the pallet-loading structure, the lumber-carrying structure and the pallet-carrying structure, they together form a unit, and the guiding element for reciprocal movement made between the lumber reciprocal-driving element and the pallet reciprocal driving-element is the common guide shaft provided astride the lumber-carrying conveyor and the pallet-riding structure with the stile-loading and stile-unloading conveyor in between.

This makes it possible to form the lumber-carrying conveyor, the stile-loading and stile-unloading conveyor, the pallet-loading structure, the lumber-carrying structure and the pallet-carrying structure into a unit, so that in shipment the unit is easy to load, carry and install. Besides, because the drive for the reciprocal movement of the lumber and the pallet is transmitted by the common guide shaft extending over from the lumber-carrying conveyor through the stile-loading and stile-unloading conveyor to the pallet-loading structure, it is possible to perform, with accuracy, the operations of stile-loading and stile-unloading the lumber and sending out and getting back the pallet by means of the guide shaft. This means that the machine is easy to construct, energy-saving and economic.

In the method of stile-loading and stile-unloading lumber for drying referred to in this invention, a lumber-carrying conveyor, a stile-loading and stile-unloading conveyor, and a pallet-loading structure being placed in the above-mentioned order and on a parallel to each other, the lumber-carrying structure being provided astride the lumber-carrying conveyor and the stile-loading and stile-unloading conveyor, the pallet-carrying structure being provided astride the stile-loading and stile-unloading conveyor and the pallet-riding structure, the method comprising the steps of: the lumber-carrying conveyor accommodating the pre-drying lumber, while the pallet-carrying structure transferring the pallet from the pallet-loading structure to the stile-loading and stile-unloading conveyor; the lumber-carrying structure making the pre-drying lumber line up and sending a required amount of the lumber from the lumber-carrying conveyor onto the pallet on the stile-loading and stile-unloading conveyor, the pallet-carrying structure transferring the pallet from the pallet-loading structure onto the lumber made line up, and such two steps being repeated in turn over and over again, until the lumber being stile-loaded in a required number of layers, and such two processes being repeated in turn over and over again, until the lumber being stile-loaded in a required number of layers; the pallet with the pre-drying lumber stile-loaded thereon in multi-layers being sent out from the stile-loading and stile-unloading conveyor for drying. after drying, the pallet with the post-drying lumber stile-loaded thereon being accommodated back onto the stile-loading and stile-unloading conveyor, the lumber-carrying structure collecting the post-drying lumber from the stile-loading and stile-unloading conveyor onto the lumber-carrying conveyor and the pallet-carrying structure collecting the pallet from the stile-loading and stile-unloading conveyor onto the pallet-loading structure, and such two steps being repeated in turn over and over again so as to send out the post-drying lumber which is collected from the lumber-carrying conveyor in turn from the lumber-carrying conveyor.

This makes it possible to perform the following steps: the lumber-carrying conveyor accommodating the pre-drying lumber, while the pallet-carrying structure transferring the pallet from the pallet-loading structure to the stile-loading and stile-unloading conveyor; the lumber-carrying structure making the pre-drying lumber line up and sending a required amount of the lumber from the lumber-carrying conveyor onto the pallet on the stile-loading and stile-unloading conveyor, the pallet-carrying structure transferring the pallet from the pallet-loading structure onto the lumber made line up, and such two steps being repeated in turn over and over again, until the lumber being stile-loaded in a required number of layers, and such two processes being repeated in turn over and over again, until the lumber being stile-loaded in a required number of layers; the pallet with the pre-drying lumber stile-loaded thereon in multi-layers being sent out from the stile-loading and stile-unloading conveyor for drying.

Further this also makes it possible to perform the following steps: the pallet with the post-drying lumber stile-loaded thereon being accommodated back onto the stile-loading and stile-unloading conveyor, the lumber-carrying structure collecting the post-drying lumber from the stile-loading and stile-unloading conveyor onto the lumber-carrying conveyor and the pallet-carrying structure collecting the pallet from the stile-loading and stile-unloading conveyor onto the pallet-loading structure, and such two steps being repeated in turn over and over again so as to send out the post-drying lumber which is collected from the lumber-carrying conveyor in turn from the lumber-carrying conveyor.

BRIEF EXPLANATION OF THE DRAWINGS

FIG. 19 is a plane view of another form of construction of the stile-loading and stile-unloading machine for wood drying referred to in this invention.

DETAILED EXPLANATION OF THE PREFERRED EMBODIMENTS

Figure 1:
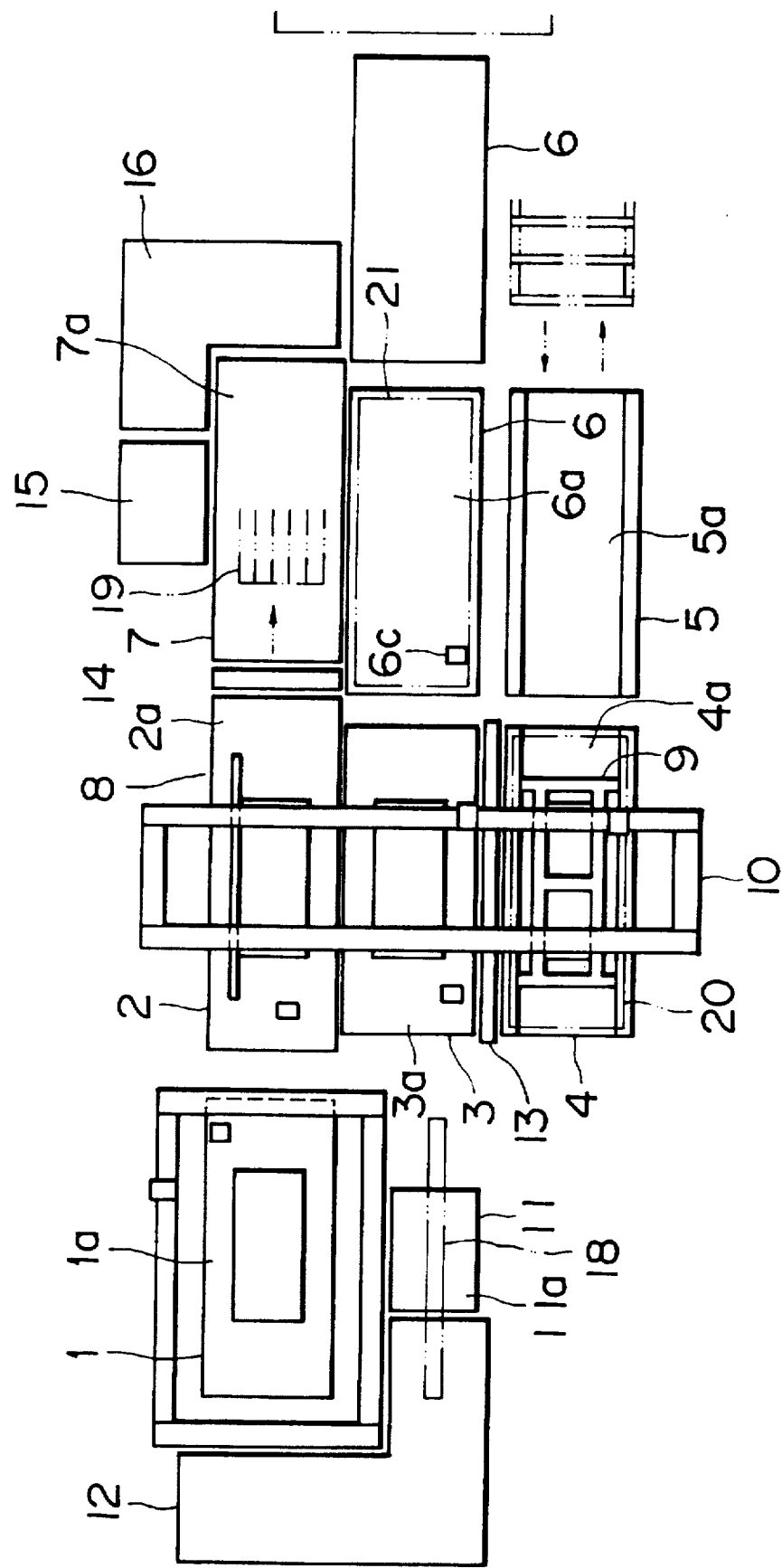
FIG. 1 is a plane view of one example of construction of the stile-loading and stile-unloading machine for lumber drying referred to in this invention.
Figure 2:
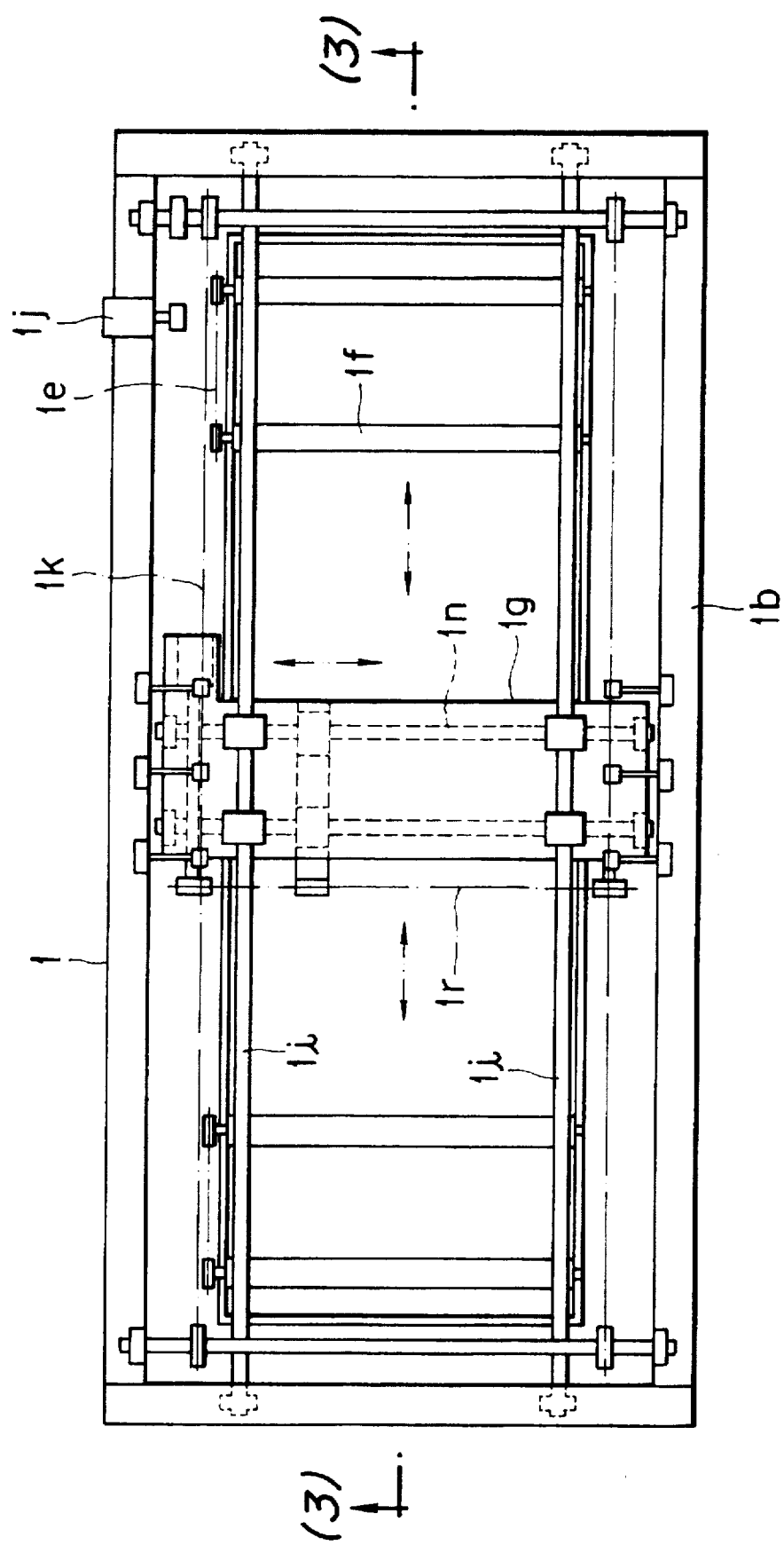
FIG. 2 is an enlarged plane view of the lumber-carrying conveyor.
Figure 3:
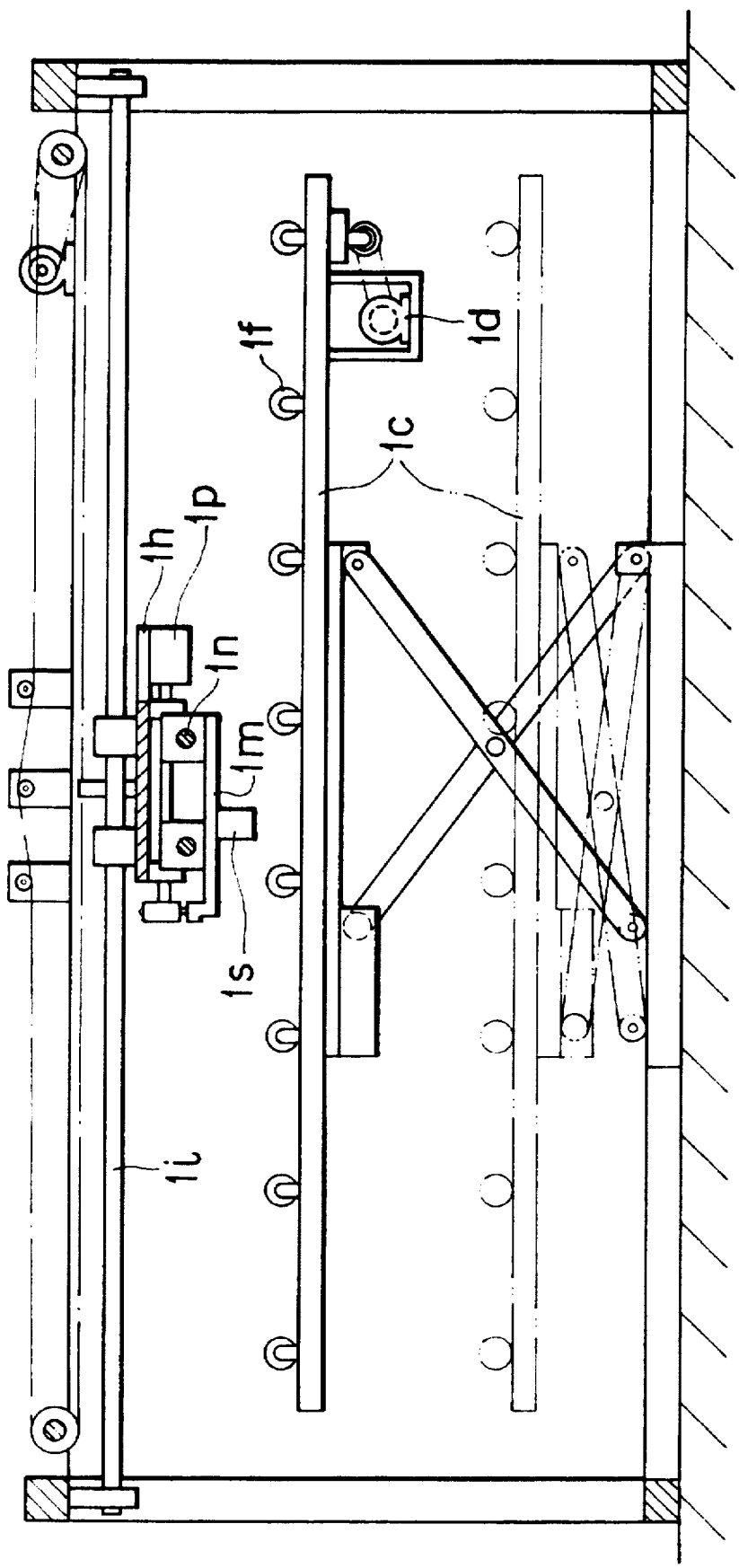
FIG. 3 is a vertical cross-sectional view of (3)—(3) in FIG. 2.
Figure 4:
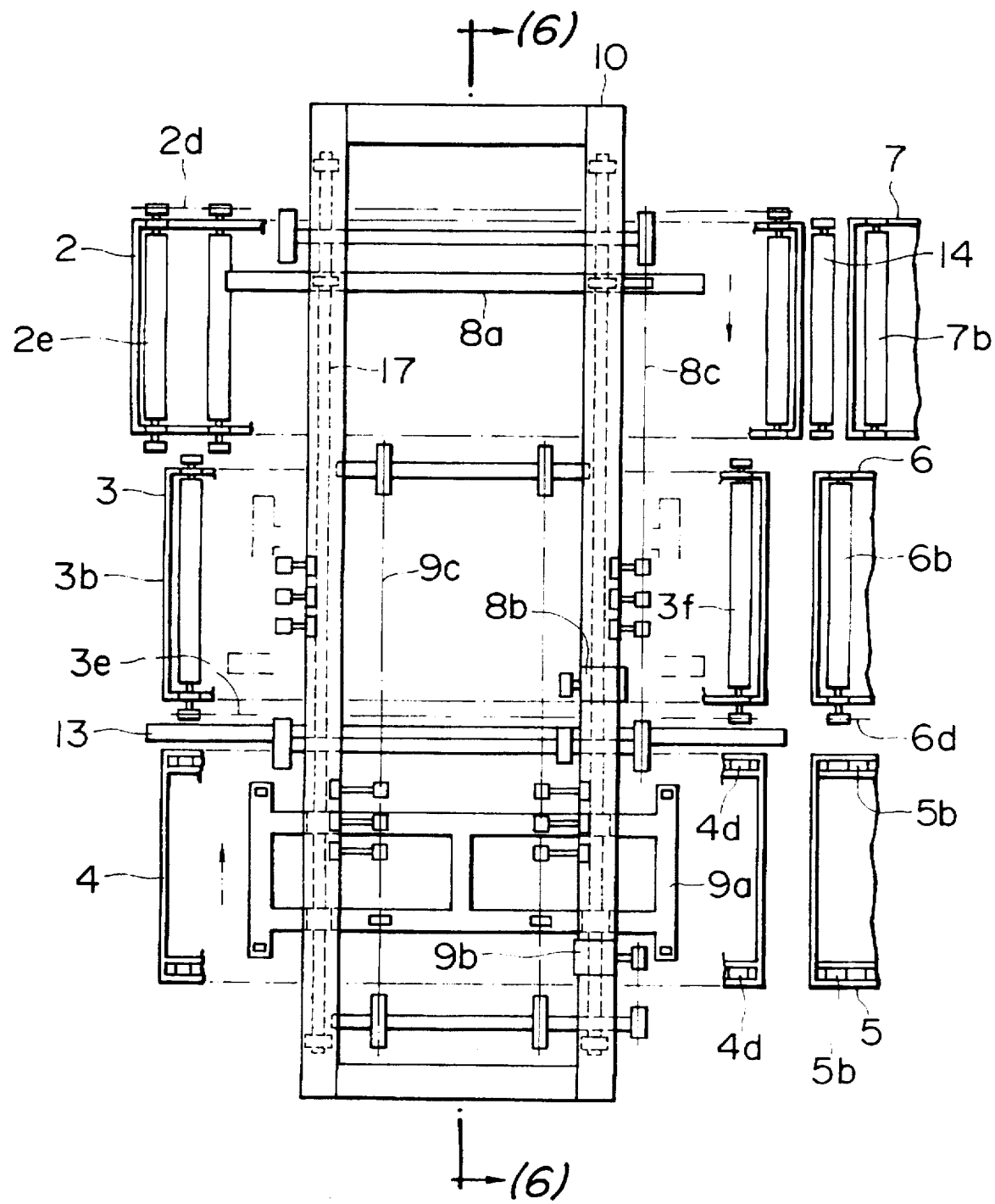
FIG. 4 is an enlarged plane view of the lumber-carrying conveyor, the stile-loading and stile-unloading conveyor, and the pallet-loading structure.
Figure 5:
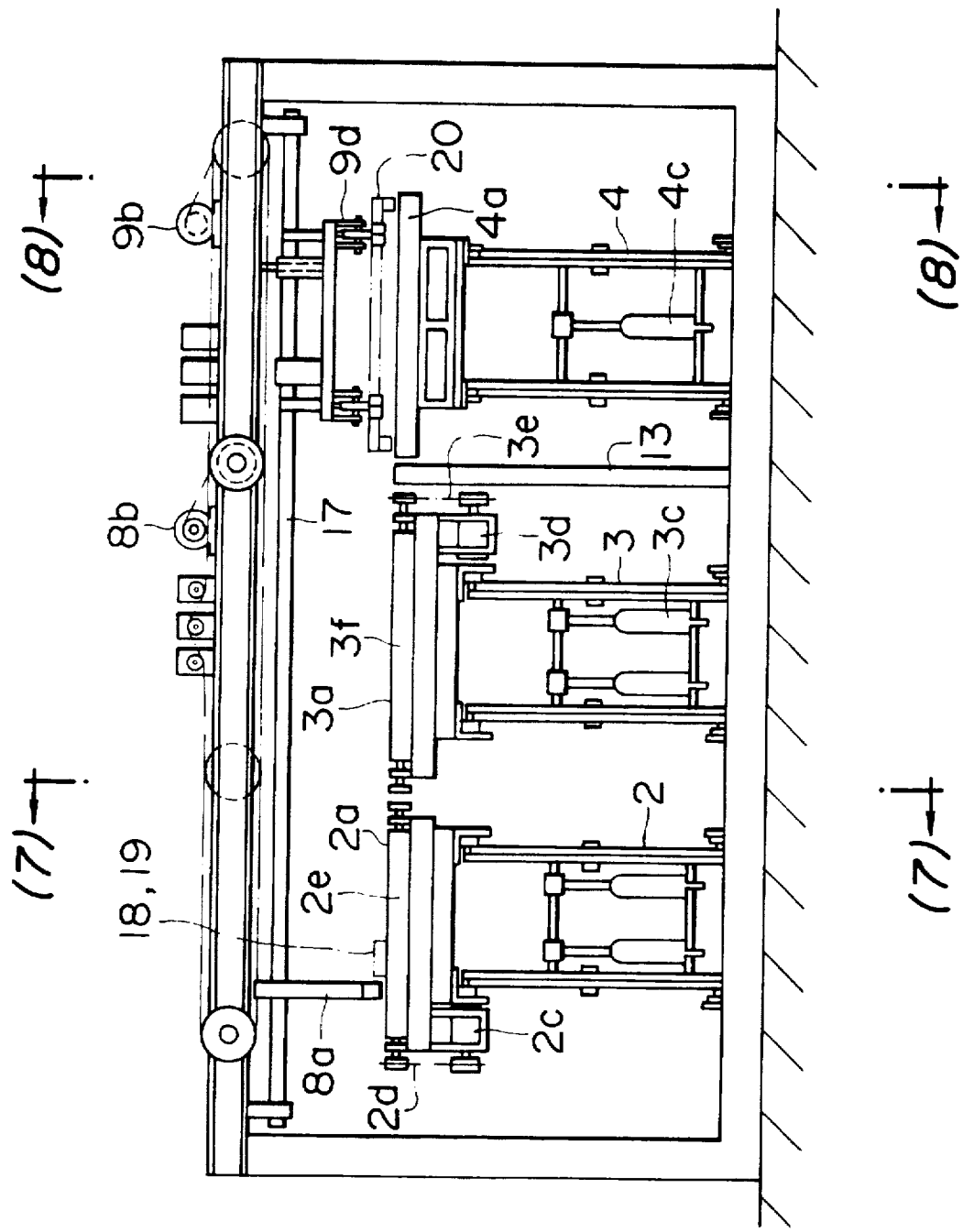
FIG. 5 is an enlarged side view of the above.
Figure 6:
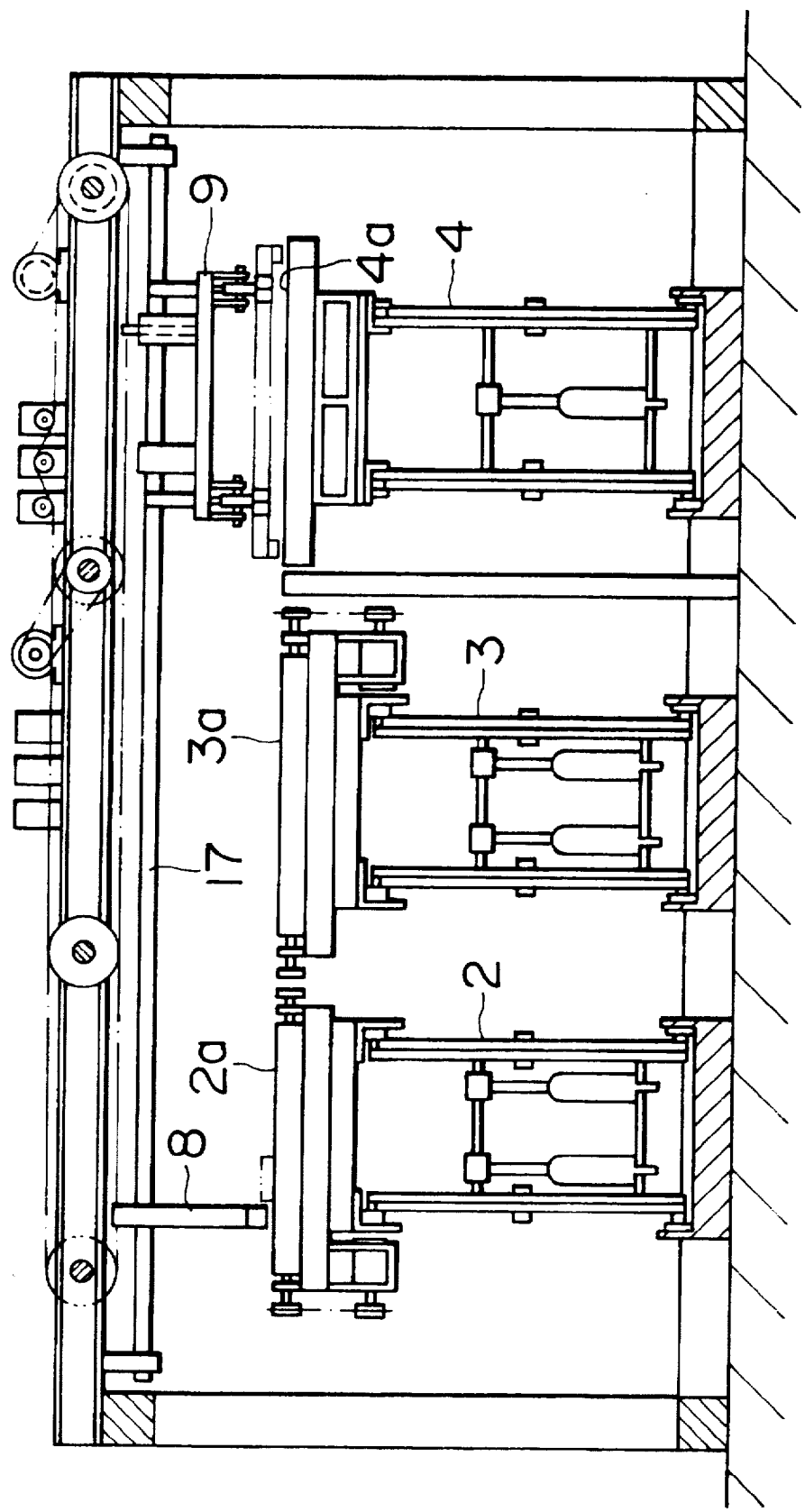
FIG. 6 is a vertical sectional-view of (6)—(6) in FIG. 4.
Figure 7:
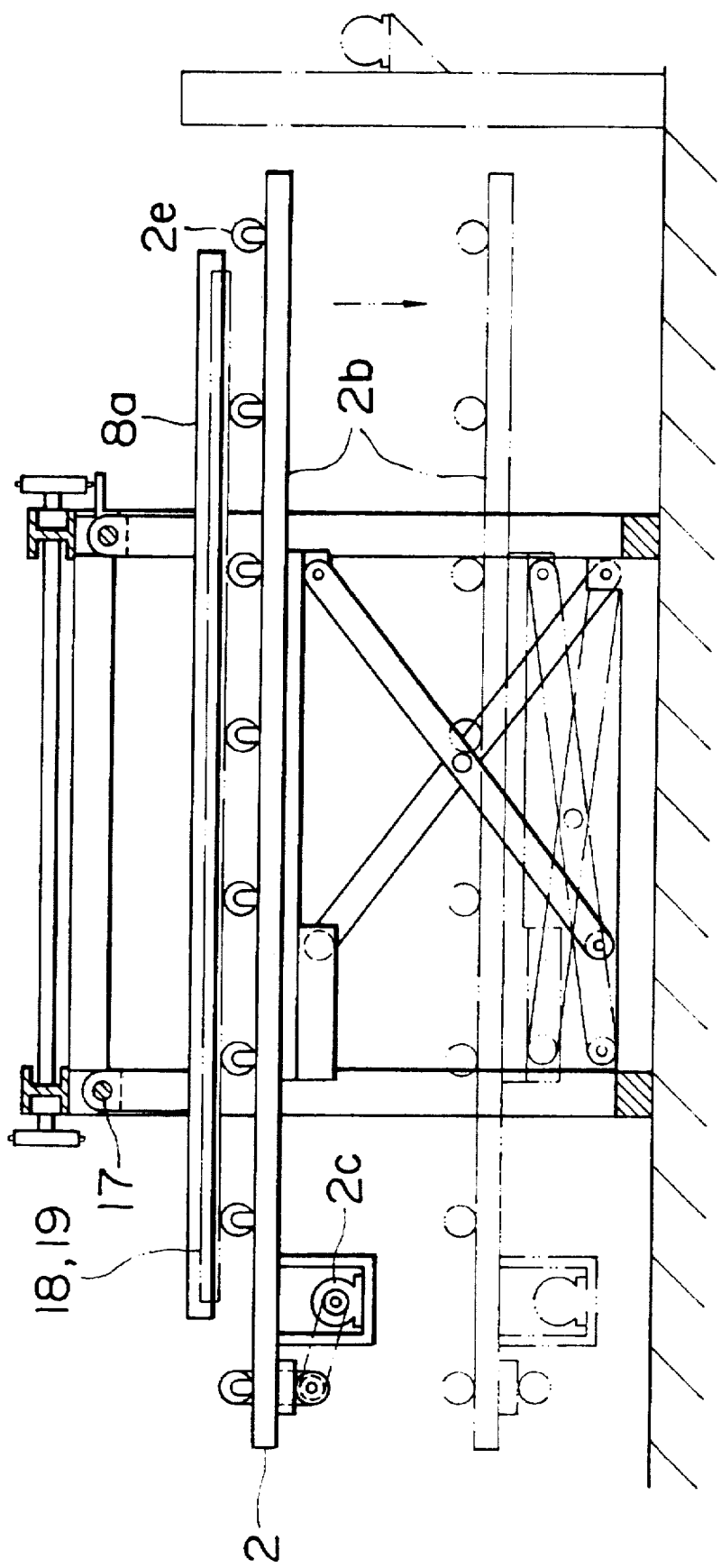
FIG. 7 is a vertical sectional-view of (7)—(7) in FIG. 5.
Figure 8:
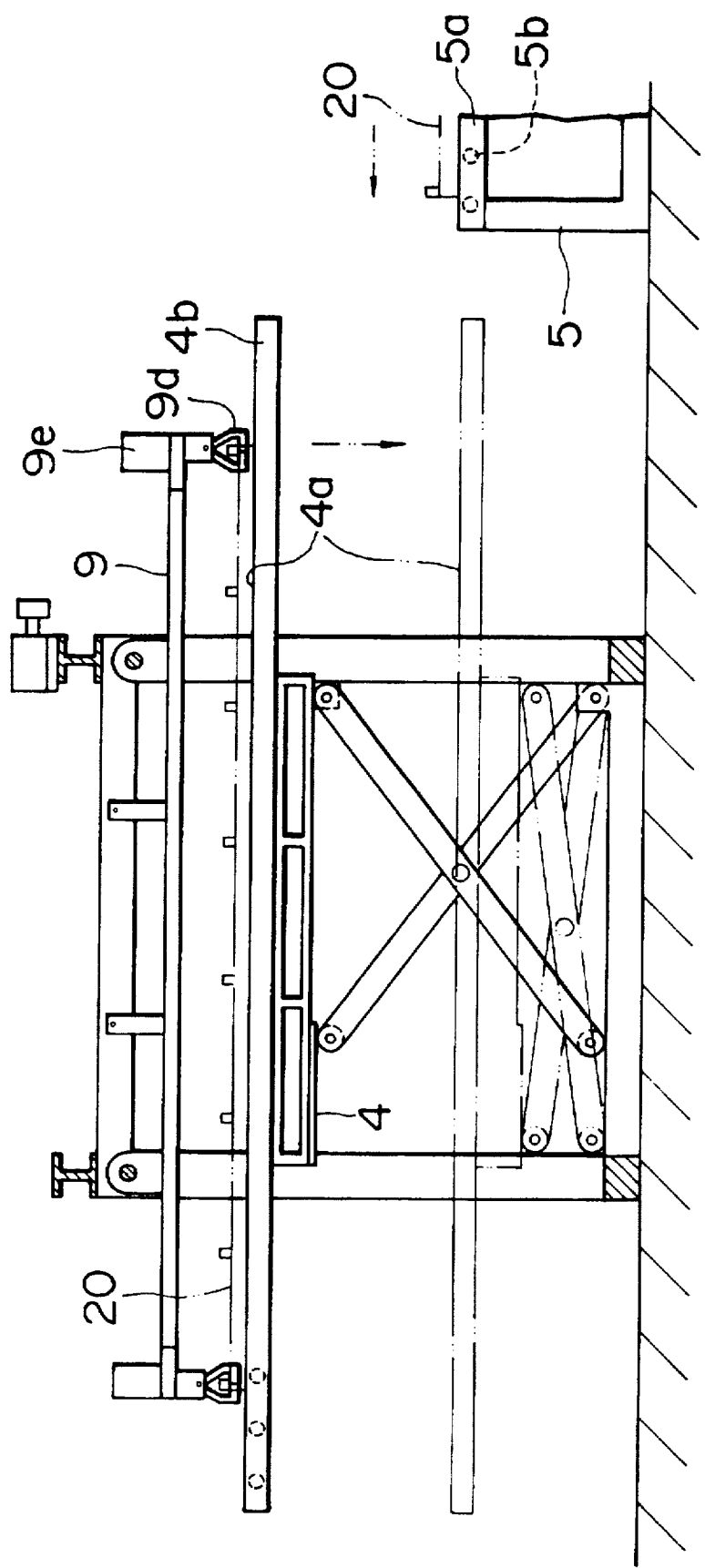
FIG. 8 is a vertical sectional-view of (8)–(9) in FIG. 5.
Figure 9:
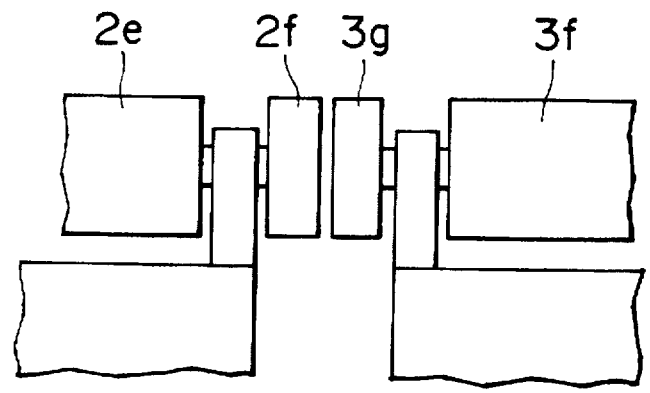
FIG. 9 is a partial enlarged side view of the chucks of the lumber-carrying conveyor and the stile-loading and stile-unloading conveyor.
Figure 10:
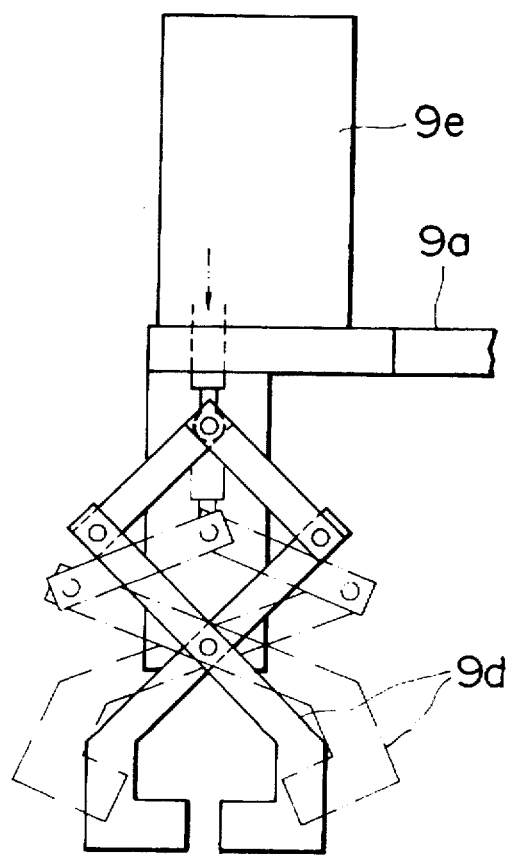
FIG. 10 is a partial enlarged front view of the roller of the pallet-carrying structure.

FIGS. 1 to 10 show one embodiment of a stile-loading and stile-unloading machine for wood drying referred to in this invention. 1 denotes the second lumber-carrying conveyor, 2 the first lumber-carrying conveyor, 3 the stile-loading and stile-unloading conveyor, 4 the pallet-loading structure, 5 the pallet-stock conveyor, 6 the pallet-carrying conveyor, 7 the third lumber-carrying conveyor, 8 the lumber-carrying structure and 9 the pallet-carrying structure.

The lumber-carrying conveyor 2, the stile-loading and stile-unloading conveyor 3 and the pallet-loading structure 4 are placed in that order and parallel to each other, and they are formed into a unit within the frame 10; the second lumber-carrying conveyor 1 is linked to the entrance side of the lumber-carrying conveyor 2, and the third lumber-carrying conveyor 7 is linked to the exit side of the lumber-carrying conveyor 2; the pallet-carrying conveyor 6 is linked to both the entrance and the exit side of the stile-loading and stile-unloading conveyor 3; the pallet-stock conveyor 5 is linked to both the entrance and the exit side of the pallet-loading structure 4; the lumber-carrying structure 8 is provided over the lumber-carrying conveyor 2 and the stile-loading and stile-unloading conveyor 3; the pallet-carrying structure 9 is provided over the stile-loading and stile-unloading conveyor 3 and the pallet-loading structure 4.

Close to one side of the second lumber-carrying conveyor 1 is provided the lift table 11, whose table 11a is capable of rotating horizontally, so the pre-drying lumber 18 placed on it can be lifted to the carriage level 1a of the second lumber-carrying conveyor 1 and then transferred onto the same conveyor. 12 is the worktable.

The second lumber-carrying-conveyor 1 is formed into a unit within the frame 1b, and rollers 1f are placed at an equal interval on the lift 1c that, driven by the cylinder (not illustrated), can go up and down with its horizontal attitude maintained. Those rollers 1f are driven by the motor 1d, since they are connected with the motor 1d through the transmission 1e. Thus it is possible to send out the pre-drying lumber 18 placed on the carrier-face 1a from the lift table 11 onto the lumber-carrying conveyor 2.

A runway 1g is positioned in the frame 1b above the lift 1c. This runway 1g consists of a first movable member 1h and a second movable member 1m, and the first movable member 1h, which bridges a pair of guide shafts 1i extending in the movement direction of the lumber and driven by the motor 1j with which it is interlocked through the transmission 1k, is capable of reciprocation in the movement direction of the carrier-face 1a composed of the rollers 1f. The second movable member 1m, which bridges another pair of guide shafts 1n extending at a right angle with the movement direction of the lumber and driven by the motor 1p with which it is interlocked through the transmission 1r, is capable of reciprocation in the cross direction of the carrier-face 1a. This second movable member 1m is equipped with a pusher 1s, and the pre-drying lumber on the carrier-face 1a can be transferred onto the lumber-carrying conveyor by controlling the movement of the pusher so that it will be brought to a position appropriate for pushing the end of the pre-drying lumber 18.

Just beside the lumber-carrying conveyor 2 is the lift 2b (see FIG. 7), which, driven by the cylinder, can go up and down with its horizontal attitude maintained, and the rollers 2c are placed on the lift 2b at an equal interval. The carrier-face 2a with the rollers 2c arranged in the aforementioned manner is level with the carrier-face 1a of the second lumber-carrying conveyor 1, so in the stile-loading operation it is possible to carry the pre-drying lumber 18 sent from the carrier-face 1a to a determined position of the carrier-face 2a and keep it waiting there until it can be transferred by the lumber-carrying structure 8 to the stile-loading and stile-unloading conveyor 3, and also in the stile-unloading operation it is possible to transfer the post-drying lumber 19 brought to the determined position of the carrier-face 2 from the third lumber-carrying conveyor 2 by the lumber-carrying structure 8, from the same position to the third lumber-carrying conveyor 7.

Each roller 2c has the side roller 2f (see FIG. 9) of the same diameter as 2c attached to its rotating shaft end facing the stile-loading and stile-unloading conveyor 3. The stile-loading and stile-unloading conveyor 3 is so constructed that its lift 3b (see FIG. 4), driven by the cylinder 3c (see FIG. 5), can go up and down with its horizontal attitude maintained, and on this lift 3b are placed a table of rollers 3f at equal intervals, which are interlocked with the motor 3d through the transmission 3e.

Figure 15:
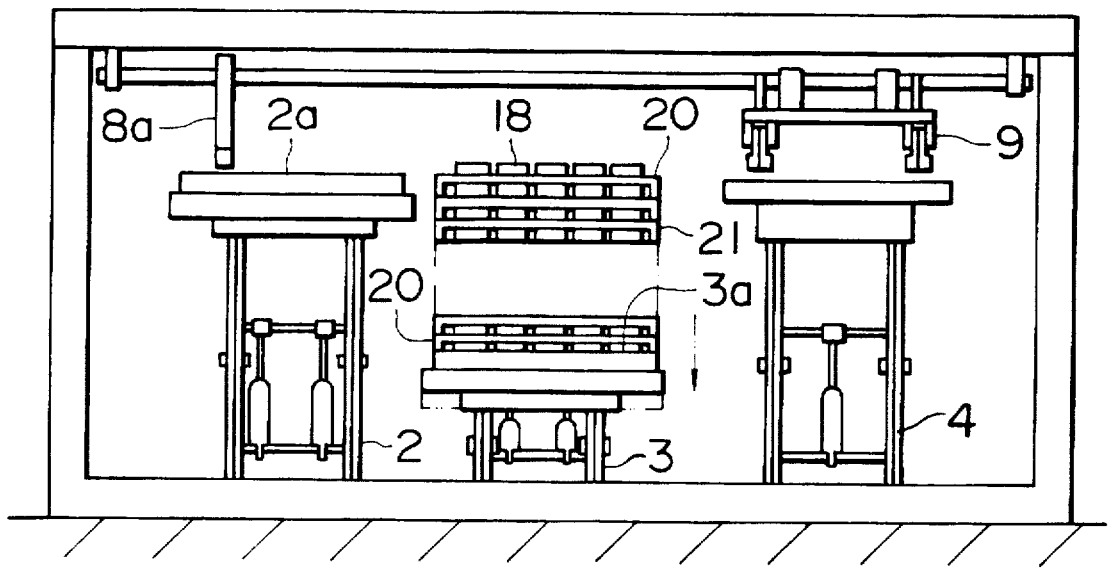
FIG. 15 is an enlarged side view of a situation in which stile-loading is just finished.
Figure 16:
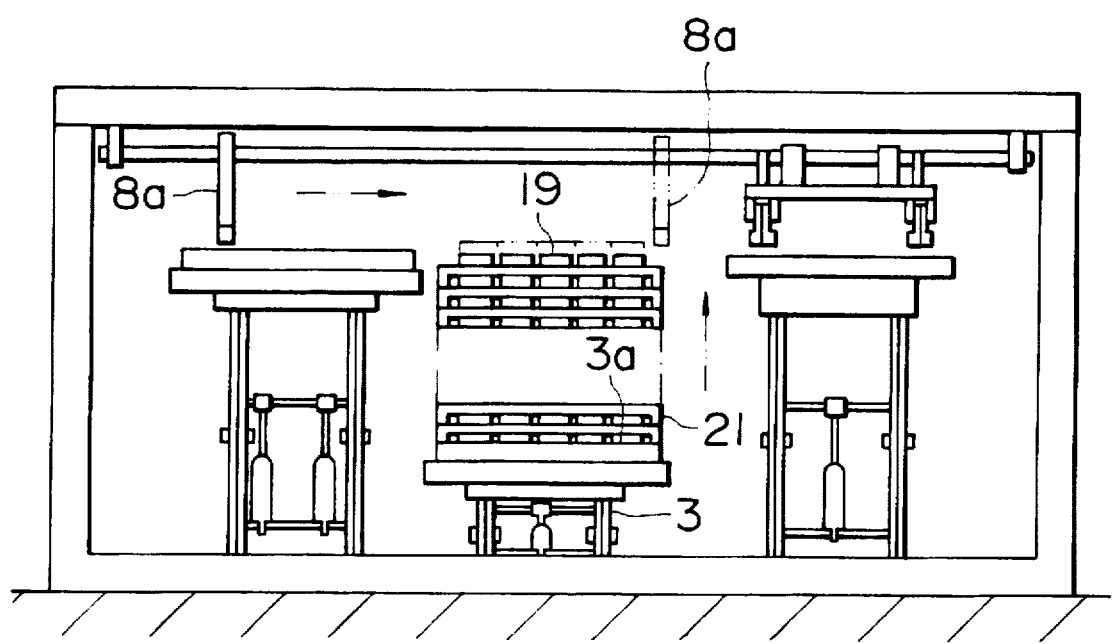
FIG. 16 is an enlarged side view of a situation in which stile-unloading is about to start.

The carrier-face 3a with the rollers 3f fixed on it at an equal interval can move up and down to control its height so that it can become level with the pallet 20 in the uppermost layer on the carrier-face 3a. Thus it is possible to stile-load the pre-drying lumber 18 onto the pallet 20 and stile-unload the post-drying lumber 19 off the pallet 20 with the lumber-carrying structure 8 and the pallet-carrying structure 9. It is also possible to convey the stile-loaded pallet 21 (see FIGS. 15 and 16) from the carrier-face 3a to the pallet-carrying conveyor 6, and to receive the stile-loaded pallet 21 from the pallet-carrying conveyor 6 to the carrier-face 3a at the proper time.

Each roller 3f has the side roller 3g (see FIG. 9) attached to its rotating shaft end facing the lumber-carrying conveyor 2, and this side roller 3g, being adjacent to the side roller 2f which faces the lumber-carrying conveyor 2, helps the lumber travel smoothly, preventing it from falling into the gap between the carrier faces 2a and 3a.

Figure 11:
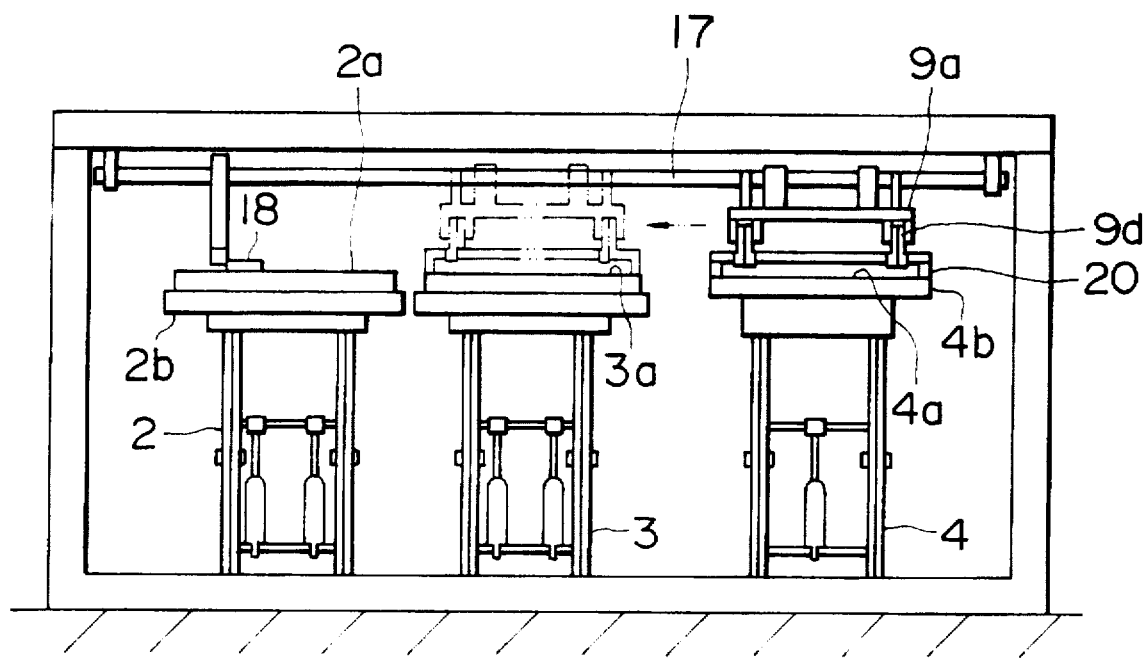
FIG. 11 is an enlarged side view of a stile-loading operation in which pallets are being moved onto the stile-loading and stile-unloading conveyor from the pallet-loading structure.

The pallet-loading structure 4 is so constructed that its lift 4b (FIG. 11), driven by the cylinder 4c (FIG. 5), can move up and down with its horizontal attitude maintained. This lift 4b has a pair of guide rollers 4d (FIG. 4) adapted to it so that the pallet 20 may move sitting astride the rollers. The loading-face 4a of the guide rollers 4d (FIG. 4) can go up and down between the upper position where, in carrying the pallet 20 to and from the stile-loading and stile-unloading conveyor 3, the pallet 20 on the loading-face 4a is clutched by, or released from, the chuck 9d of the pallet-carrying structure 9, and the lower position where the loading-face 4a becomes level with the carrier-face 5a of the pallet-stock conveyor 5 so that the pallet 20 can be transferred from the carrier-face 5a (FIG. 8) to the loading face 4a and vice versa.

In the stile-loading operation, the pallet-loading structure 4 can lift the pallet 20 sent from the pallet-stock conveyor 5 to the upper position, thus getting ready for the pallet-carrying structure 9 sending the pallet to the stile-loading and stile-unloading conveyor 3. In the stile-unloading operation, the pallet-loading structure 4 accommodates the pallet 20 from the stile-loading and stile-unloading conveyor 3 at the upper position and then goes down to the lower position to return the pallet onto the pallet-stock conveyor 5.

The screen 13 stands between the pallet-loading structure 4 and the stile-loading and stile-unloading conveyor 3, and it is just high enough not to interfere with the pallet-carrying structure 9 carrying the pallet 20 and at the same time prevent the lumber from ever intruding itself into the pallet-loading structure 4.

The pallet-stock conveyor 5 has a pair of guide rollers 5b attached on it so that the pallet 20 can move sitting astride the rollers, and the pallet, when pushed, can go from the carrier-face 5a of the guide rollers 5b to the pallet-loading structure 4 and, when pulled, come back to the carrier-face 5a.

Figure 14:
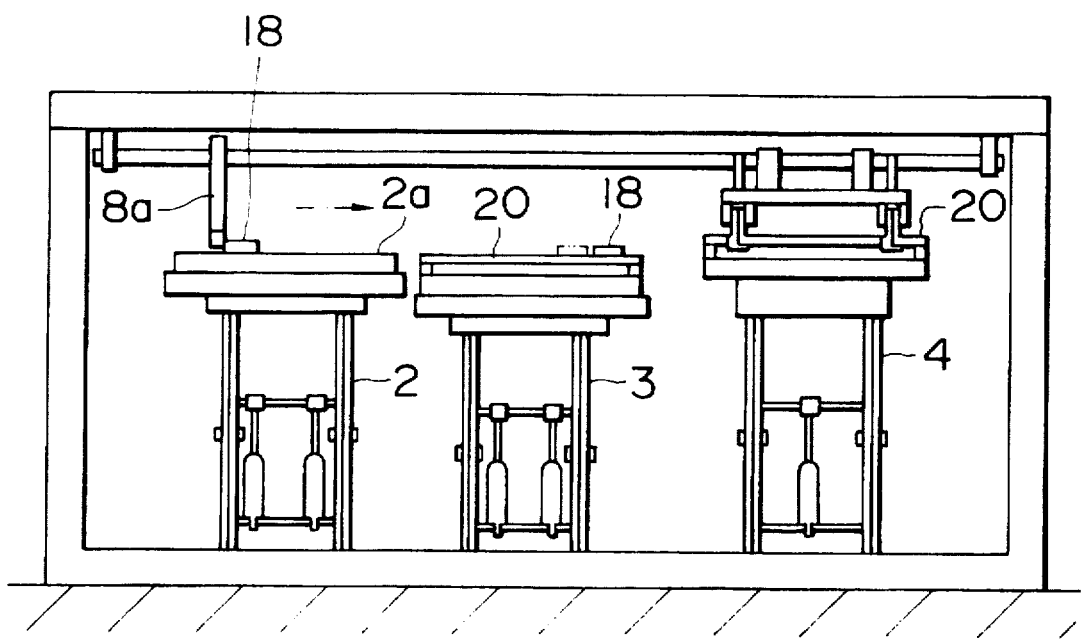
FIG. 14 is an enlarged side view of a step in the above operation in which preparation is being made for accommodating the next pallet after having finished sending the pre-drying lumber onto the stile-loading and stile-unloading conveyor and stile-loading it on the pallet there.

On the pallet-carrying conveyor 6 are placed the rollers 6b at equal intervals, which form the carrier face 6a (FIG. 14). Each roller 6b, driven by the motor 6c (FIG. 1) with which it is interlocked through the transmission 6d (FIG. 4), can rotate and, after the stile-loading operation is over, accommodate the stile-loaded pallet 21 from the stile-loading and stile-unloading conveyor 3 onto the carrier-face 6a and carry it into the kiln. Also in the stile-unloading operation, the pallet-carrying conveyor 6 is so controlled that it can accommodate the stile-loaded pallet 21 with the post-drying lumber on it and transfer it to the stile-loading and stile-unloading conveyor 3 at a proper time.

On the third lumber-carrying conveyor 7 are the rollers 7b placed at an equal distance, which form the carrier-face 7a that can accommodate the post-drying lumber 19 sent from the lumber-carrying conveyor 2. The pinch-roller 14 is placed between the carrier-face 2a and the carrier-face 7a so that lumber of short length can travel smoothly.

On one side of the third lumber-carrying conveyor 7 is provided the lift table 15 which can go up to the level of the carrier-face 7a to accommodate the post-drying lumber 19 from the same conveyor. 16 is the worktable.

In the lumber-carrying structure 8, the carrying-bar 8a bridges the pair of guide shafts 17 provided over the lumber-carrying conveyor 2, the stile-loading and stile-unloading conveyor 3, and the pallet-loading structure 4 which are all placed parallel to each other within the frame 10. This carrying-bar 8a, interlocked with the motor 8b through the transmission 8c, can travel reciprocally along the pair of guide shafts 17 between the carrier-face 2a of the lumber-carrying structure 2 and the carrier-face 3a of the stile-loading and stile-unloading conveyor 3, and its travel distance can be controlled. Thus in the stile-loading operation, the pre-drying lumber 18 on the carrier-face 2a are sent one by one onto the pallet 20 an the carrier-face 3a and lined up there facing a certain direction at a certain interval; in the stile-unloading operation, the post-drying lumber 19 can be collected back from the pallet 20 on the carrier-face 3a onto the carrier-face 2a.

The movable member 9a of the pallet-carrying structure 9 bridges the space between the guide shafts 17, and this movable member 9a, interlocked with the motor 9b through the transmission 9c, can move reciprocally between the ride-face 4a of the pallet-loading structure 4 and the carrier-face 3a of the stile-loading and stile-unloading conveyor 3.

The movable member 9a has the chucks 9d suspending from its four corners, and the opening and closing of each chuck interlocked with the cylinder 9e can be so controlled that in the stile-loading operation they can clutch the pallet 20 on the ride-face 4a which has come up to the upper position and carry it to the carrier-face 3a at a proper time, while in the stile-unloading operation they clutch the pallet on the carrier-face 3a and carry it back onto the ride-face 4a at the upper position.

The second lumber-carrying conveyor 1, the lumber-carrying conveyor 2, the stile-loading and stile-unloading conveyor 3, the pallet-loading structure 4, the pallet-stock conveyor 5, the pallet-carrying conveyor 6, the third lumber-carrying conveyor 7, the lumber-carrying structure 8, the pallet-carrying structure 9, are all automatically controlled with CPU adopting various kinds of commonly-known sensors and switches and work at a proper time to stile-load the pre-drying lumber 18 in the determined number of layers or to stile-unload the post-drying lumber 19. The pallet 20 is composed of several crosswise bars bridging the space between two lengthwise bars placed in parallel, and aluminum or some other metal which is highly corrosion-resistant and light should be an ideal material for a pallet.

Now here is an explanation of in what state the lumber is when stile-loading and stile-unloading are being performed and of how the operations are performed with the machine referred to in this invention. In this machine, the lift members 1c and 2b of the second lumber-carrying conveyor 1 and of the lumber-carrying conveyor 2 respectively are positioned at a fixed height.

In the stile-loading operation, the pre-drying lumber 18 is loaded on the lift table 11, lifted to the level of the carrier-face 1a of the second lumber-carrying conveyor 1, and transferred from the lift table 11 onto the carrier-face 1a. The transferred pre-drying lumber 18 then goes from the carrier-face 1a to the carrier-face 2a of the lumber-carrying conveyor 2.

Meanwhile, the pallet 20 is sent from the pallet-stock conveyor 5 onto the carrier-face 4a of the pallet-loading structure 4 at the lower position, raised by the lift 4b to the upper position, and clutched by the chucks 9d of the movable member 9a waiting for the pallet there. Then the lift 4b goes down to the lower position, accommodates the pallet 20 from the pallet-stock conveyor 5 onto the carrier-face 4a, and gets ready for transferring it to the stile-loading and stile-unloading conveyor 3, while the pallet 20, suspended by the movable structure 9a, is carried to the stile-loading and stile-unloading conveyor 3 (see FIG. 11).

Figure 12:
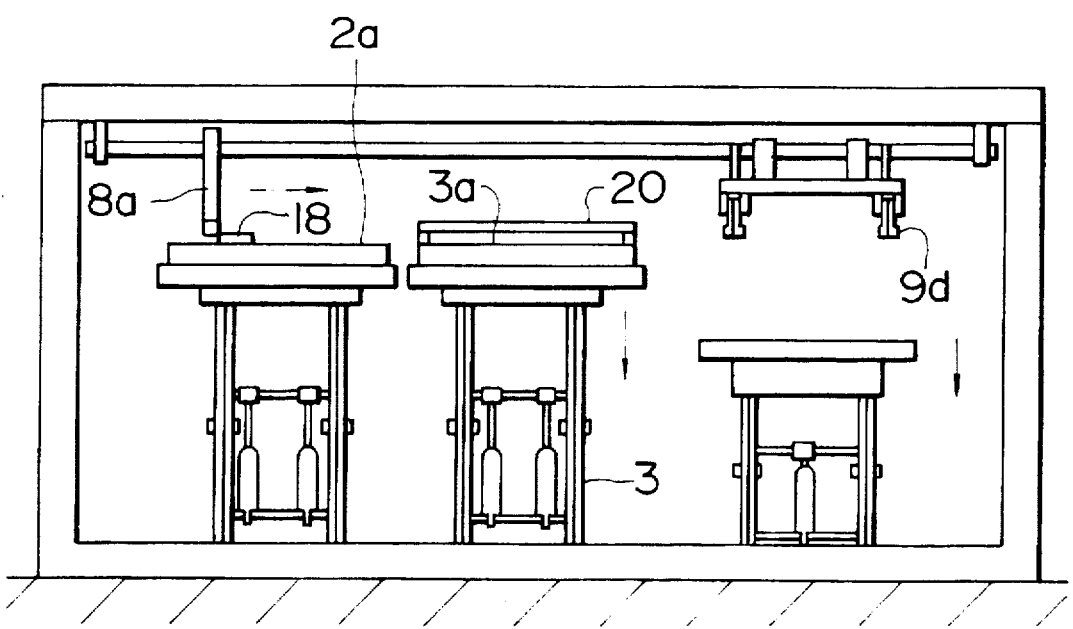
FIG. 12 is an enlarged side view of the above operation in which pallets have already been moved onto the stile-loading and stile-unloading conveyor.
Figure 13:
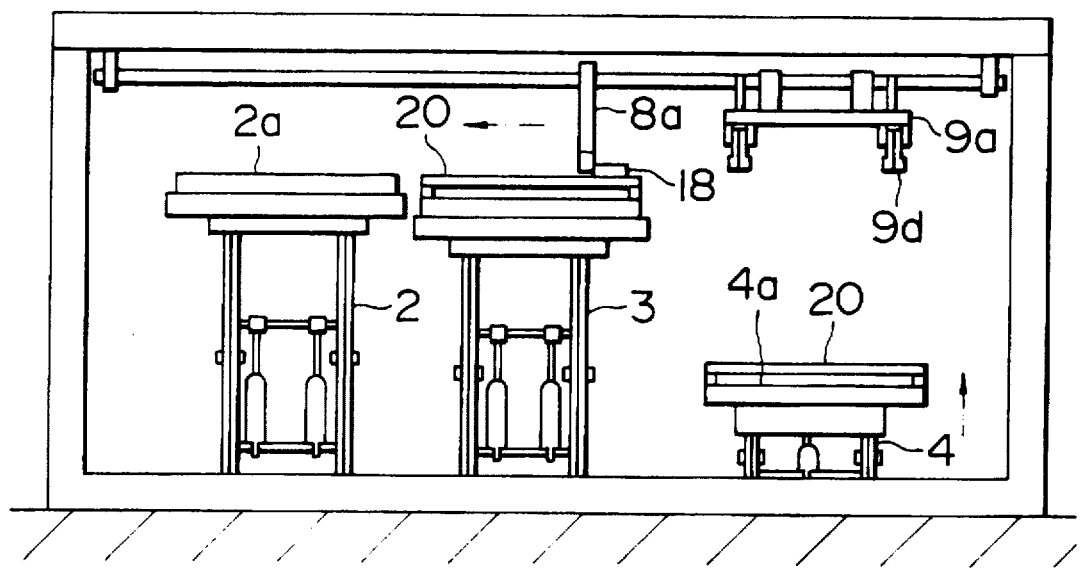
FIG. 13 is an enlarged side view of the above operation in which the pre-drying lumber is being carried to be stile-loaded onto the stile-loading and stile-unloading conveyor.

The pallet 20, carried to a position just above the stile-loading and stile-unloading conveyor 3, is lowered onto the carrier-face 3a, when the chucks 9d open above it, and then gets ready for stile-loading the pre-drying lumber 18. When the pallet 20 is prepared for stile-loading, the carrier-bar 8a of the lumber-carrying structure 8 starts its reciprocal movement and, making the pre-drying lumber 18 line up on the carrier-face 2a, transfers it onto the pallet 20 on the carrier-face 3a. This transference operation is repeated over and over again until a required number of lumber pieces are stile-loaded on the pallet 20 at a certain interval (see FIGS. 12 to 14).

When stile-loading on the pallet 20 in the first layer is finished, the carrier-bar 8a stands still at the position where the pre-drying lumber 18 is sent out from the carrier-face 2a; the carrier-face 3a goes down to the position where stile-loading in the second layer is possible now and accommodates the post-drying lumber from the carrier-face 2a which forms the first layer, while another pallet 20 for the second layer, conveyed from the pallet-stock conveyor 5 by the pallet-carrying structure 9, is placed on the first pallet 20. Thus preparation for stile-loading in the second layer is completed.

Following the above-mentioned preparation, the carrier-bar 8a starts to move reciprocally again, making the pre-drying lumber 18 line up on the carrier-face 2a, sends them out onto the pallet 20 for the second layer, stile-loads a required number of pieces at a certain interval, and completes the stile-loading operation for the second layer. Thus, in forming an each layer, transference of the pallet 20 and stile-loading of pre-drying lumber 18 are repeated several times until a required number of layers are formed (see FIG. 15).

When a required number of layers are formed, the lumber-carrying structure 8 and the pallet-carrying structure 9 cease to operate, and the stile-loaded pallet 21 on the carrier-face 3a is transferred onto the pallet-carrying conveyor 6. As soon as the transference is finished, the stile-loading of the pre-drying lumber 18 starts again, and the stile-loaded pallet 21, when stile-loaded, is moved from the carrier-face 3a to the carrier-face 6a.

In the stile-unloading operation, the stile-loaded pallet 21 on which the post-drying lumber 19 is stile-loaded is transferred from the carrier-face 6a of the pallet-carrying conveyor 6 to the carrier-face 3a of the stile-loading and stile-unloading conveyor 3. At this moment, the carrier-bar 8a of the lumber-carrying structure 8 is waiting at the position where the post-drying lumber can be collected from the carrier-face 3a (see FIG. 16).

Figure 17:
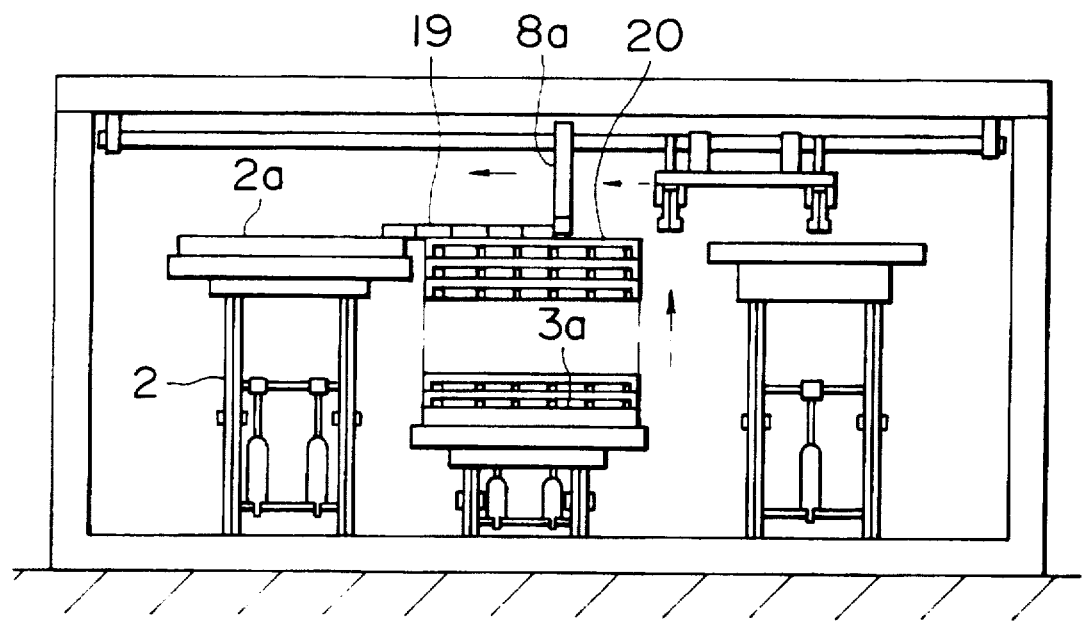
FIG. 17 is an enlarged side view of a situation in the stile-unloading operation, in which the post-drying lumber is being collected from the pallet onto the lumber-carrying conveyor.

Then the carrier-face 3a moves to the position for stile-loading and stile-unloading where the upper side of the pallet 20 in the uppermost layer is level with the carrier-face 2a of the lumber-carrying conveyor 2, and the post-drying lumber 19 on the uppermost pallet 20 is transferred by the carrier-bar 8a onto the carrier-face 2a of the lumber-carrying conveyor 2, subsequently sent from there to the carrier-face 7a of the third lumber-carrying conveyor 7 (see FIG. 17).

Figure 18:
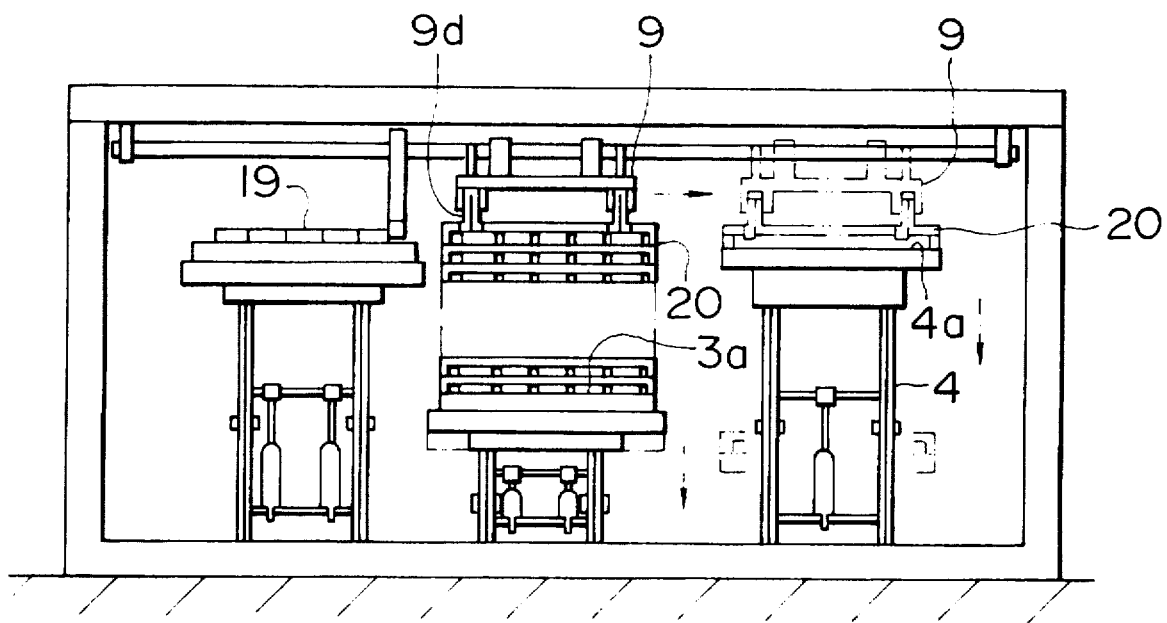
FIG. 18 is an enlarged side view of a situation in the stile-unloading operation, in which the pallet is being collected back onto the pallet-loading structure.

Meanwhile, the uppermost pallet 20, from which the post-drying lumber 19 is gone, is gripped and suspended by the chucks 9d of the pallet-carrying structure 9, carried to the upper-positioned ride-face 4a of the pallet-loading structure 4. Then the ride-face 4a goes down to the lower position so that the pallet 20 can be stocked on the pallet-stock conveyor 5. Immediately after this, the carrier-face 4a moves back to the upper position for collecting the next pallet 20 which has gone through stile-unloading (see FIG. 18).

As soon as the post-drying lumber 19 is collected from the uppermost pallet 20 and the post-drying lumber 19 and the pallet 20 are stile-unloaded, the operation for stile-unloading the next pallet starts; thus the pallet in each layer is stile-unloaded until the operation is finished with the bottom layer. Then the stile-loaded pallet 21 is transferred from the pallet-carrying conveyor 6 to the carrier-face 3a, and the stile-unloading operation is renewed.

Thus, making the pre-drying lumber 18 line up facing a certain direction in each layer on the pallet 20, carrying it onto the pallet 20, stile-loading it in a required number of layers, transferring the stile-loaded pallet 21 with the lumber loaded on it to the pallet-carrying conveyor 6, all these stile-loading operations can be automatically performed. Also accommodating the stile-loaded pallet 21 which has gone through drying, unloading the post-drying lumber 19 off the pallet 20 thus separating the post-drying lumber 19 from the pallet 20, all these stile-unloading operations can be automatically performed as well.

Also since the second lumber-carrying conveyor 1 is linked in series with the lumber-carrying conveyor 2 to transfer the pre-drying lumber 18 to the lumber-carrying conveyor 2 and the third lumber-carrying conveyor 7 is linked in series with the lumber-carrying conveyor 2 to accommodate the post-drying lumber 19 from it, the second lumber-carrying conveyor 1 can wait readily for transferring the pre-drying lumber 18 to the lumber-carrying conveyor 2 by use of the runway 1g.

FIG. 19 shows another embodiment of a machine for stile-loading and stile-unloading lumber for drying referred to in this invention. Because its structures are essentially the same as those of the one mentioned so far, explanation will be made only of those different structures.

What are missing in this machine are the third lumber-carrying conveyor 7, the pinch-roller 14, the lift table 15 and the worktable 16. Each roller 1f on the carrier-face 1a of the second lumber-carrying conveyor 1 and each roller 2e on the carrier-face 2a of the lumber-carrying conveyor 2 can rotate in both ways, so that in the stile-unloading operations they rotate in reverse to return the post-drying lumber 19 from the carrier-face 2a to the carrier-face 1a.

This method helps to make the pre-drying lumber 18 line up in each layer before sending them onto the pallet 20, stile-load them in a required number of layers on the pallet 20, and carry the stile-loaded pallet 21 to the pallet-carrying conveyor 6. The method also makes it possible to accommodate the stile-loaded pallet 21 after drying from the pallet-carrying conveyor 6 and to stile-unload the post-drying lumber 19 and the pallet 20 separately. All of those operations can be automated, and since the second lumber-carrying conveyor 1 can be used not only for sending out the pre-drying lumber 18 but for collecting the post-drying lumber 19, it will save a considerable amount of money from facility investment.

Also in the stile-unloading operations with those different devices, the post-drying lumber 19 can be collected from several layers at once by lowering the lift 2b to a proper position and using the stiles. However, there is no figure which shows this.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope and spirit of the invention as defined by the appended claims.

What is claimed is:

1. A stile-loading and unloading apparatus for lumber which comprises:

a first elongated lumber-carrying conveyor which includes drive means for loading and unloading lumber thereon, an elongated pallet-loading structure which is parallel to said first elongated lumber-carrying conveyor, an elongated stile-loading and unloading conveyor which is parallel to said first elongated lumber-carrying conveyor and said elongated pallet-loading structure and is positioned therebetween, said elongated stile-loading and unloading conveyor comprising a table means defining a carrier face for supporting at least one pallet and a lift means for raising and lowering said table means, and frame means which extends laterally over said first elongated lumber-carrying conveyor, said elongated stile-loading and unloading conveyor and said elongated pallet loading structure, said frame means supporting a lumber-carrying structure which includes a lumber reciprocating drive element for moving aligned lumber laterally between said lumber-carrying conveyor and pallets positioned on said stile-loading and unloading conveyor, and a pallet-carrying structure which includes a pallet reciprocating drive element for moving pallets laterally between said pallet-loading structure and said stile-loading and unloading conveyor, said stile-loading and unloading conveyor being capable of transferring stiles of layered pallets and lumber into and out of a drying kiln.

2. A stile-loading and unloading apparatus according to claim 1, including a second elongated lumber-carrying conveyor aligned with said first elongated lumber-carrying conveyor, an elongated pallet-carrying conveyor aligned with said stile-loading and unloading conveyor, and an elongated pallet-stock conveyor aligned with said pallet-loading structure.

3. A stile-loading and unloading apparatus according to claim 1, wherein said frame structure includes a common guide shaft to which said lumber reciprocating drive element and said pallet-reciprocating drive element are attached.

4. Method for a stile-loading and unloading of lumber with an apparatus comprising an elongated lumber-carrying conveyor, an elongated stile-loading and unloading conveyor aligned in parallel with said lumber-carrying conveyor, and an elongated pallet-loading structure aligned in parallel with said lumber-carrying conveyor, a lumber-carrying structure extending over the lumber-carrying conveyor and the stile-loading and unloading conveyor, and a pallet-carrying structure extending over the stile-loading and unloading conveyor and the pallet-loading structure, the method comprising the steps of:

positioning lumber on the lumber-carrying conveyor while the pallet-carrying structure transfers a pallet from the pallet-loading structure to the stile-loading and unloading conveyor;

aligning the lumber on the lumber-carrying conveyor with the lumber-carrying structure and sending a required amount of the lumber from the lumber-carrying conveyor onto a pallet on the stile-loading and unloading conveyor, transferring another pallet from the pallet-loading structure onto the lumber, and repeating these steps until the lumber is stile-loaded in a required number of layers;

conveying stacked pallets and lumber stile-loaded on the stile-loading and unloading conveyor into a dryer, and after drying, returning the stacked pallets and lumber back onto the stile-loading and unloading conveyor, moving the lumber carrying structure to relocate the lumber from the stile-loading and unloading conveyor onto the lumber-carrying conveyor and moving the pallet-carrying structure to relocate the pallets from the stile-loading and unloading conveyor onto the pallet-loading structure, and repeating such steps so as to send out the dried lumber which is collected on the lumber-carrying conveyor.

* * * * *